United States Patent
Heine

[11] Patent Number: 6,165,361
[45] Date of Patent: Dec. 26, 2000

[54] APPARATUS FOR THE FILTERING AND SEPARATION OF FLOW MEDIA WITH AT LEAST ONE PERMEATE OUTLET

[75] Inventor: Wilhelm Heine, Hamburg, Germany

[73] Assignee: Rochem Ro-Wasserbehandlung GmbH, Hamburg, Germany

[21] Appl. No.: 09/096,707

[22] Filed: Jun. 12, 1998

[30] Foreign Application Priority Data

Apr. 23, 1998 [DE] Germany ............... 198 18 094

[51] Int. Cl.⁷ ..................................... B01D 63/04
[52] U.S. Cl. .................. 210/232; 210/321.8; 210/323.2; 210/433.1
[58] Field of Search .................... 210/500.23, 323.2, 210/321.72, 321.75, 321.78, 321.79, 321.8, 321.84, 321.87, 321.88, 321.89, 232, 433.1, 435

[56] References Cited

U.S. PATENT DOCUMENTS

| | | |
|---|---|---|
| 4,220,535 | 9/1980 | Leonard ............... 210/321.89 |
| 4,781,834 | 11/1988 | Sekino et al. ............... 210/321.88 |
| 5,207,906 | 5/1993 | Auvil et al. ............... 210/321.8 |
| 5,211,728 | 5/1993 | Trimmer ............... 95/47 |
| 5,228,991 | 7/1993 | Strohm et al. ............... 210/321.8 |
| 5,352,361 | 10/1994 | Prasad et al. ............... 210/321.81 |
| 5,626,752 | 5/1997 | Mohn et al. ............... 210/321.75 |
| 5,639,373 | 6/1997 | Mahendran et al. ............... 210/636 |
| 5,783,083 | 7/1998 | Henshaw et al. ............... 210/636 |

Primary Examiner—Matthew O. Savage
Assistant Examiner—Richard W. Ward
Attorney, Agent, or Firm—Klaus J. Bach

[57] ABSTRACT

In an apparatus for the filtering and separation of flow media rich in foreign matter (raw media) by a membrane separation structure, wherein the flow medium is separated into a retentate enriched with foreign matter and a permeate depleted of foreign matter and wherein at least the permeate is discharged from the apparatus, a membrane separation structure forming a flow medium flow channel is formed by at least one membrane module mounted between two support elements, which are removably disposed in the flow medium spaced from one another in the flow direction of the flow medium through the apparatus.

9 Claims, 4 Drawing Sheets

Section D

Section A

Section B

Section C

[6,165,361]

APPARATUS FOR THE FILTERING AND SEPARATION OF FLOW MEDIA WITH AT LEAST ONE PERMEATE OUTLET

BACKGROUND OF THE INVENTION

The invention relates to an apparatus for the filtering and separation of flow media (raw media) enriched with foreign matter, particularly of liquid media, utilizing the principle of ultra-filtration by means of a membrane separation apparatus, wherein the flow medium is admitted to the membrane separation apparatus and is divided into a retentate enriched with the foreign matter and wherein at least the permeate is discharged by way of at least one outlet.

Such apparatus have been known for some time in various different forms. They are utilized for different separation purposes, and for different flow media to be separated, for example for gaseous flow media, vapor-like media and also for liquid media. An area of application which becomes increasingly prominent for economical as well as ecological reasons is the separation of municipal and commercial waste waters which include relatively large amounts of biological foreign matter. These flow media in the form of municipal and commercial waste water which below will simply be called waste water, pose high requirements with regard to the membrane separation devices used in the apparatus, the effectiveness of the separation of the waste water into pure water obtained as the permeate and concentrate representing the retentate with regard to a service-free long time use, a good servicing capability and an unproblematic easy exchange of membrane equipment when the membrane separation devices become inoperative that is they can no longer fulfill their purpose of separation or when they are totally destroyed.

The waste waters addressed herein include relatively large amounts of various types of foreign matter. The greater the proportion of foreign matter in a certain volume of the flow medium, the greater is also the probability that the foreign matter is deposited on the membrane separating structure and covers increasingly large areas of the membrane after first an area (cluster) of the membrane is occupied by the foreign matter until the whole active surface of the membrane element is covered and the membrane element becomes inoperative. In this connection, it is said that the membrane element is totally blocked.

The blocking of the membrane however occurs often because of the way the flow medium enriched with the foreign matter is guided through the apparatus. Often, the flow passages are complicated so that, in order to achieve a minimum flow speed for the flow medium, the flow medium must be subjected to relatively high pressures to overcome the hydraulic resistance occurring in the apparatus because of its complicated design. This also results in a relatively high energy consumption.

However, a problem of greater impact than the high energy consumption concerns the membranes utilized which need to be designed in such a way that they can withstand the high pressures in order to be able to be utilized in the present apparatus for the given purpose. State of the art apparatus utilize flat membranes of various types which are stacked in spaced relationship from one another such that the flow medium to be separated passes through the apparatus from its inlet to its outlet in a meander-like fashion while flowing along the membrane elements. A blocking of, or damage to only a single membrane element in such an arrangement means that the whole apparatus must be fully disassembled, the respective membrane element must be replaced and the apparatus must be reassembled. This requires a relatively large amount of time which results in relatively high operating costs. For waste water with relatively large amounts of waste such apparatus and membrane elements have therefore been found to be not particularly suitable.

In order to avoid a disassembly of the known apparatus, it has therefore been tried—which in many cases is still being done—to clean the apparatus by means of a separate cleaning solution which is conducted through the apparatus and which includes chemical ingredients specifically formulated for the removal of the foreign material from the membrane elements. In this way, however, the cleaning agent which includes chemical ingredients forms another mixture which must be collected separately as it cannot be simply discharged to the waste water system, but must be separately processed that is decontaminated.

It is therefore the object of the present invention to provide an apparatus of the type mentioned above which however requires only a relatively low pressure to provide for the flow of the flow medium through the apparatus and which facilitates replacement of the membrane separation structure when the separation efficiency of the flow medium becomes too low or a membrane separation structure is blocked. In addition, the apparatus should be easy to clean when the separation efficiency drops but, in any case, it should remain operative without servicing over long periods. Also, the apparatus should be usable at any location and use only relatively little energy for its operation. Finally, it should be simple in design so that it can be made and operated relatively inexpensively.

SUMMARY OF THE INVENTION

In an apparatus for the filtering and separation of flow media rich in foreign matter (raw media) by means of a membrane separation structure, wherein the flow medium is separated into a retentate enriched with foreign matter and a permeate depleted of foreign matter and wherein at least the permeate is discharged from the apparatus, a membrane separation structure is formed by at least one membrane module mounted between two support elements, which are disposed in the flow medium spaced from one another in the flow direction of the flow medium through the apparatus.

The advantage of the arrangement according to the invention resides essentially in the fact that the membrane separating structure is formed practically by at least one or rather a multitude of independently operating membrane modules which can be easily inserted into, and removed from, the apparatus when they become defective. In addition, this arrangement also facilitates the manufacture of the individual modules which are then simply inserted into the apparatus, all being of the same design. Furthermore, because of the identical design modules may be held ready for exchange at low costs. The removal and installation of the modules in the apparatus is simple and can be performed by inexperienced workers. Since the modules are mounted between two spaced support elements and orientation in the flow direction of the flow medium the flow resistance is minimal. A complicated meander-type flow path through the apparatus as it has been used in the prior art apparatus is not necessary; that is, the operating pressure used for the operation of the apparatus according to the invention to make the flow medium flow alongside the membrane elements, and possibly for a vacuum to be formed at the permeate side, can be relatively low although the pressure differential between the flow medium and the permeate which is important for the effectiveness of the separation of the flow medium is still as high as it is needed. For the reasons mentioned, the apparatus is simple and can be made inexpensively. In a basic version, it may not even need a housing, that is, the modules can simply be placed into a waste water containment or into a flow pipe of the waste water containment and it still can fulfill all the functions without restriction.

In a preferred embodiment of the invention, the membrane modules are mounted essentially in the flow direction of the flow medium within the apparatus, that is, with this measure the hydraulic resistance experienced by the flow medium when flowing through the apparatus is at a minimum. However, basically, it is also possible to arrange the membrane modules for example, transverse or at a certain angle with respect to the flow direction. But this is generally only then the case when design considerations require such an arrangement.

In another advantageous embodiment of the apparatus a membrane module includes a plurality of membrane elements wherein the number of membrane elements depends on the desired active membrane surface area per membrane module. The desired active membrane surface area per membrane module depends also on the length of the membrane module that is the distance between the two support elements between which the membrane module is supported or fixed.

Preferably, the membrane elements are so arranged that they form a flow channel for the flow medium in order to provide for optimal flow by of the flow medium. They are for example so arranged that they form a tubular flow cross-section for the flow medium.

As membrane elements, any suitable membrane elements can be utilized provided they can be adapted by the membrane module as designed and in a predetermined manner. For example, the membrane elements may comprise membrane pillows which are known per se (pillow membranes, pocket membranes, membrane pockets—these terms are all synonyms). But the membranes may also be provided in the form of hollow fiber membranes. In the apparatus, according to the invention, the hollow fiber membranes have an advantage when compared with other membranes, since already by their shape that is with their long form, they are very suitable for installation in a membrane module and, because of their shape, they do not require any additional support elements. However, also stripe-like membrane pillows could be used. Nevertheless, the hollow fiber membrane is most suitable for use in the modules and consequently, in the apparatus according to the invention.

Basically, the membrane elements can be so formed that they are open at their two ends at the two support elements, that is, they have permeate discharge openings at these ends. This may apply to the hollow fiber membranes and also to the membrane pillows. It has been found to be advantageous and sufficient if the membrane elements were closed at one end at one support element so that only the other end has an opening for the discharge of the permeate.

In another advantageous embodiment of the apparatus, the end areas of the membrane elements are with their closed ends fixed in a first receiver element in a sealed manner with respect to the flow medium preferably by means of a suitable plastic material or casting resin. In order to be able to remove the membrane module rapidly from the support element of the apparatus or to mount it on the support element, preferably the first and an additional second receiver element (see below) are removably mounted in the first or respectively, second support element by way of the receiver element. The module can also be easily removed from the support elements in a reversed order.

In another advantageous embodiment of the apparatus, the end areas of the membrane elements at their open ends at the second support element are fixed in a second receiver element in a sealed manner with respect to the flow medium. The receiver means in the second receiver element provide for a quasi-identical fixing with respect to the flow medium as it is described earlier in the respect to the first receiver element. Also, in this case, the end areas may be fixed in the receiver element by a suitable casting resin or plastic material.

In order to insure an optimum flow of the flow medium along the membrane elements so that they can fulfill their separation functions in an optimal manner, the first and the second receiver elements each include an essentially centrally arranged passage for the flow medium to pass therethrough. Since the membrane elements themselves are disposed at a predetermined distance from one another and consequently permit the flow of the flow medium also at the sides of the membrane elements outside the inner flow channel formed by the membrane elements, the membrane elements are in contact with the flow medium at all sides.

In still another advantageous embodiment of the apparatus, the second receiver element includes a permeate collection passage into which all the open ends of the membrane elements lead. In this way, the permeate can be collected in a simple manner so that no expensive design features for the collection of the permeate in the apparatus are necessary.

The support elements are fixed at a distance from one another preferably by at least one spacer rod, wherein the unit comprising the support elements and the spacer rods does not need to be disassembled when a module is replaced. Because of the elasticity of the membrane modules, they can be simply inserted into corresponding receiver openings in the support elements utilizing the respective receiver elements or they can be removed therefrom.

Consequently, preferably the first and the second receiver element can be fixed to the support elements by means of disconnectable securing elements. The securing elements may be, for example, locking rings in the form of so-called Seeger rings.

As already mentioned earlier, the apparatus does not necessarily need a housing in order to perform the functions for which it is designed. However, for certain applications, it may be advantageous to design the apparatus such that it includes a tubular housing, which surrounds at least the support elements and the membrane modules in the housing, wherein all the supply and discharge elements are disposed and the means needed for the set up of the apparatus are received.

If a housing is provided, at least the second receiver element is fixed with respect to the housing interior and in sealed relationship with the housing in order to facilitate the discharge of the permeate from the filter elements out of the housing in such a way that the permeate remains separated from the flow medium and the retentate enriched by foreign matter. The housing may include separate admission and discharge elements for the flow medium to be separated and the concentrated retentate which elements also penetrate the housing wall in a sealed manner.

Below, the invention will be described in detail with reference to the accompanying schematic drawings on the basis of a particular embodiment of the invention.

DESCRIPTION OF PREFERRED EMBODIMENTS

Figure 1:
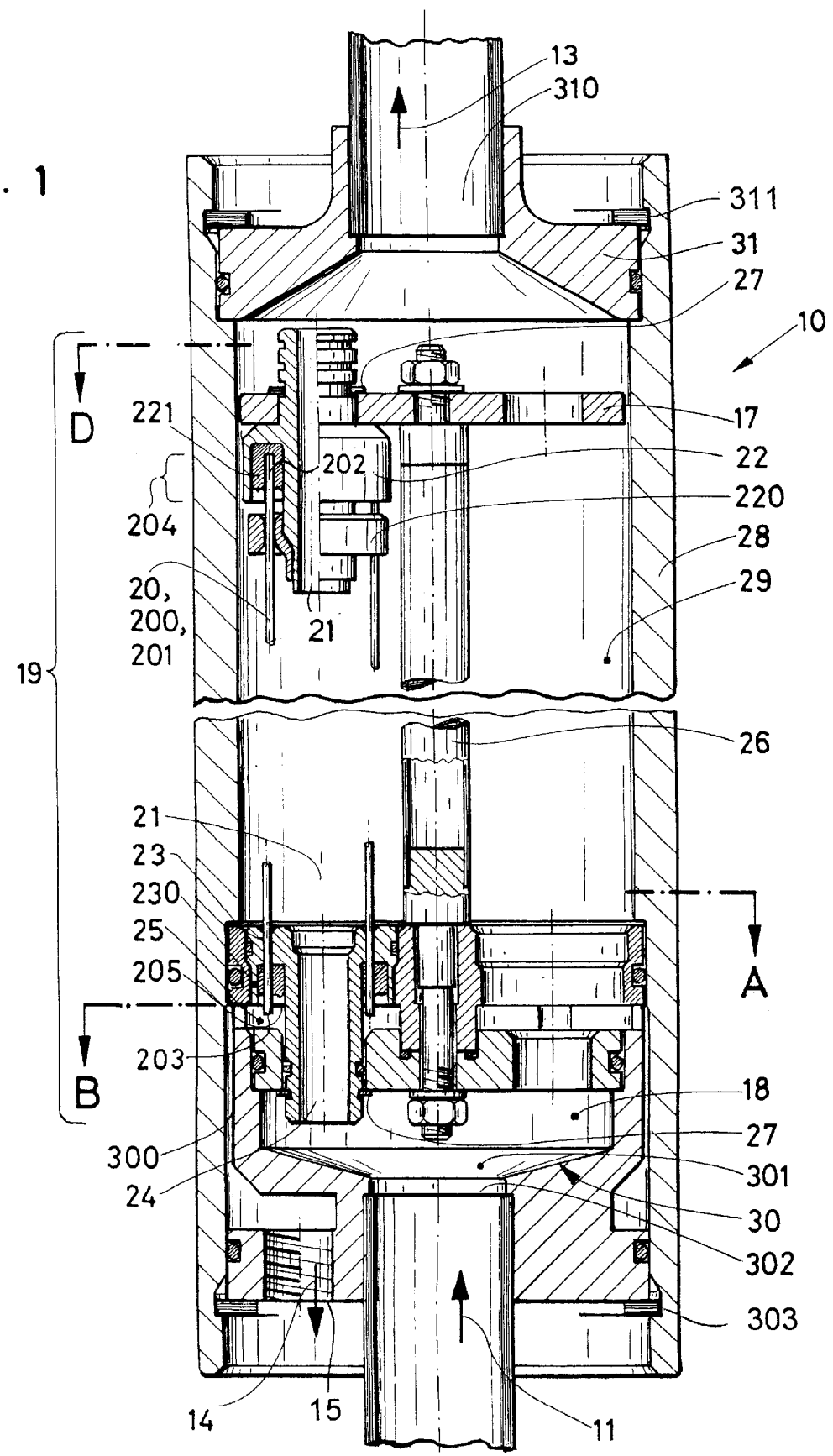
FIG. 1 is a cross-sectional view of the apparatus showing the design in principle wherein the apparatus includes a separate housing.
Figure 2:
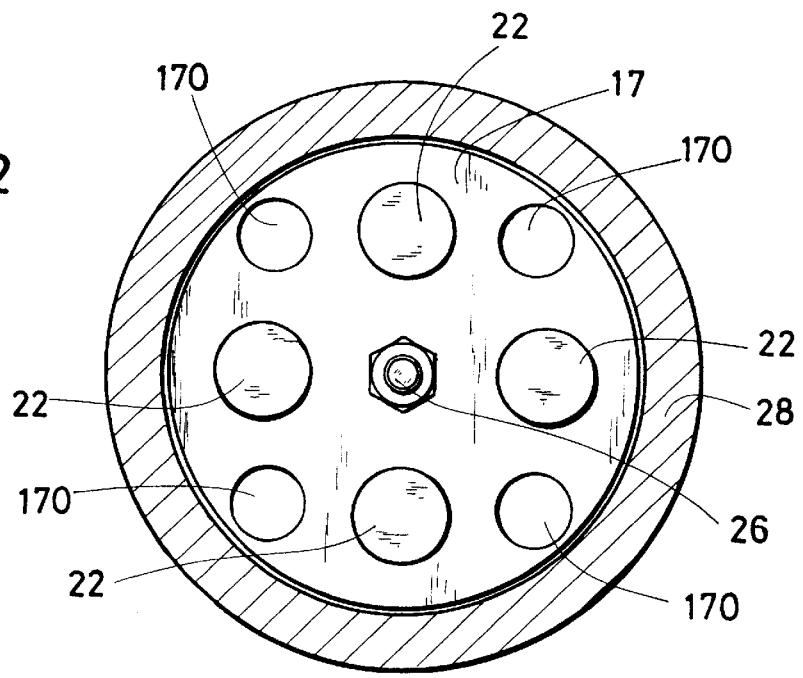
FIG. 2 is a cross-sectional view taken along line D of FIG. 1.
Figure 4:
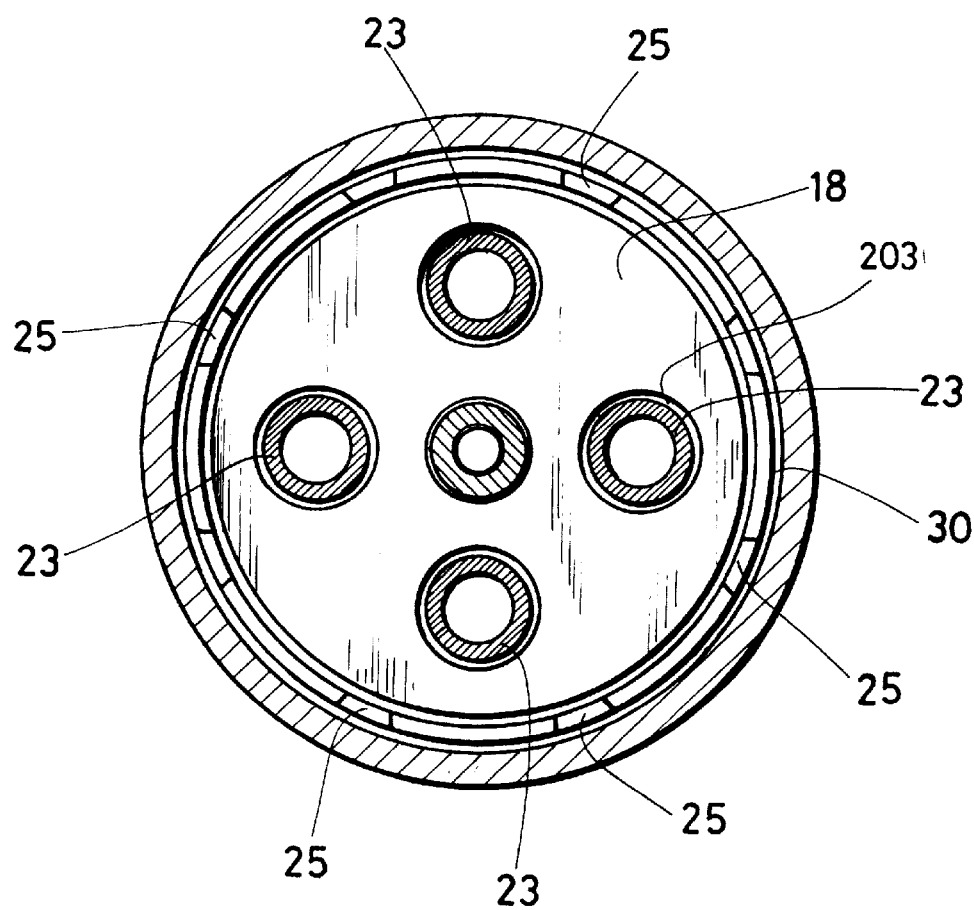
FIG. 4 is a cross-sectional view taken along line B of FIG. 1.
Figure 5:
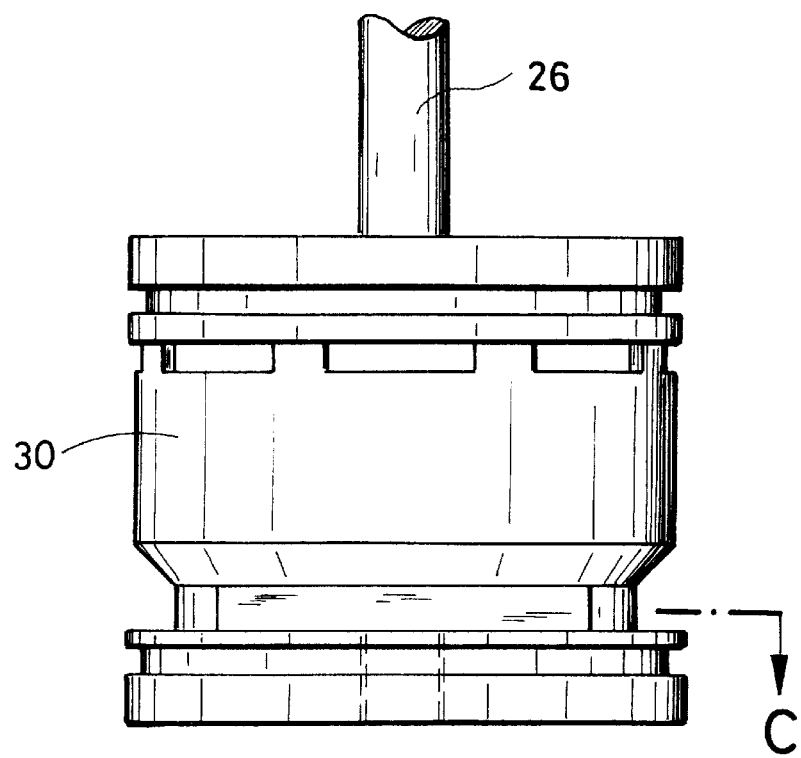
FIG. 5 is a side view of a receiving element into which the open ends of the membrane element are inserted and in which the permeate collection and discharge passage is disposed and in which a support element is received.
Figure 6:
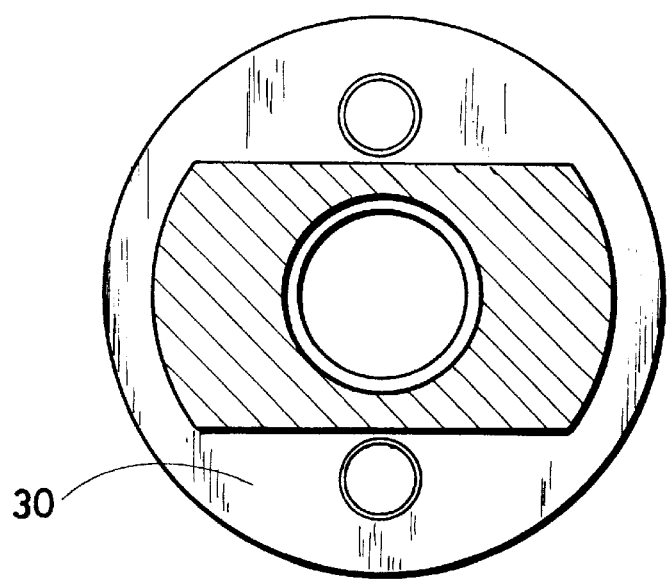
FIG. 6 is a cross-sectional view taken along line C of FIG. 5.

First, reference is made to the presentation according to FIG. 1, from which, in cross-section, the design of the apparatus 10 according to the invention is essentially apparent. The central element of the apparatus 10 comprises two disc-like support elements 17, 18 which are held at a fixed distance from each other by means of a spacer rod 26. The spacer rod 26 is provided at its ends with threaded projections over which the two support elements 17, 18 are placed and firmly engaged with the spacer rod 26 by means of nuts so that they are removable. The support elements 17, 18 have a design as shown in the top view of FIG. 2, where the first support element 17 is shown and in FIG. 4, which shows the second support element 18 in a top view. The support elements 17, 18 include a plurality of bores distributed over the surface areas thereof which serve the reception of the first and, respectively, the second receiver elements 22, 23 which will be described further below in greater detail in connection with the design of the membrane module 19. The first and second receiver elements 22, 23 extend into the bores mentioned before that is they are inserted through the bores and are removably retained therein by means of retaining rings 27 (see FIG. 1). In the center of the respective support elements 17, 18, there are through-bores through which the threaded projections or a reduced diameter-portion of the spacer rod 26 extend in order to fix the support elements 17, 18 in a predetermined manner.

In the embodiment of the apparatus 10 as shown in FIG. 1, four membrane modules 19 are mounted in the respective through-bores through the first and second support elements 17, 18, which are arranged centrally and in axial alignment with regard to each other, the membrane elements having the following basic design. All membrane modules 19 are of identical design so that below only one membrane module is described.

Figure 3:
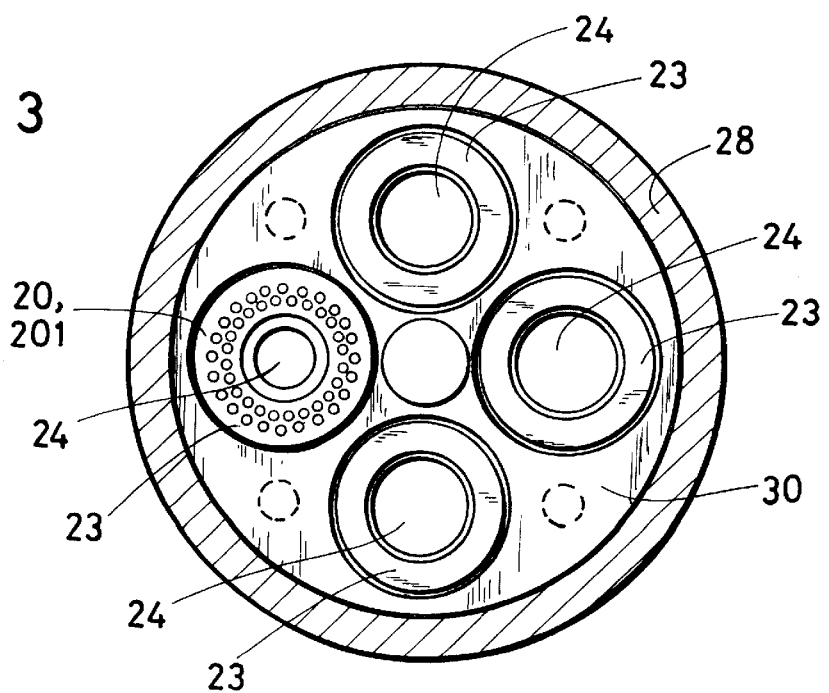
FIG. 3 is a cross-sectional view taken along line A of FIG. 1.

At both ends of the membrane module 19, there are provided receiver elements, the first receiver element 22 being shown in the top part of FIG. 1 and the second receiver element being shown in the bottom part of FIG. 1. Each receiver element 22, 23 includes a central passage 24 for accommodating the flow medium (raw medium, feed) 11. In an exemplary manner, FIG. 3 shows the four second receiver elements 23 arranged in the apparatus 10 in such a way that they include a plurality of membrane elements 20 in the form of hollow fiber membranes 201. The arrangement of the membrane elements in the form of hollow fiber elements 201 is such that they define a flow channel 21 (see FIG. 1) for the flow medium 11. The hollow fiber membranes 201 are disposed closely adjacent to one another in radial as well as in circumferential direction so that the flow medium 11 coming from the passage 24 can enter the housing interior space 29 through the gap between the hollow fiber membranes 201. In this way, the complete housing interior space 29 between the exit of the passage 24 of the second receiver element 23 and the passage 24 of the first receiver element is filled. Depending on the dimensions of the first and the second receiver elements 22, 23 and the desired number of the hollow fiber membranes 201, the design of the first and the second receiver elements 22, 23 is the same so that, during the manufacture of the membrane module 19, the receiver elements 22, 23 can first be disposed on top of each other whereby the hollow fiber elements 201 can then be inserted through the bores in the receiver elements. The upper first receiver element 22 may include a separate guide element 220, which can be inserted into the first receiver element 22 after insertion of the hollow fiber membrane 201. After the hollow fiber membranes are inserted into the annularly arranged receivers 221 and 230, respectively, and arranged at the desired distance from one another, they are fixed in the respective receiver elements 22, 23 by a suitable casting resin such that the end areas 204, 205 of the hollow fiber membranes 201 are held and sealed in the respective first and second receiver elements 22, 23 with respect to the flow medium 11.

In the embodiment of the apparatus 10 as shown herein the hollow fiber membranes 201 are closed at their ends 202 disposed at the first support element 17. The closure of the hollow fiber membranes 201 is obtained by the casting resin 221 during fixing of the membrane ends.

The end 203 at the second receiver element 23 remains open. The openings of the hollow fiber membranes 201 are provided in that, after pouring of the casting resin or suitable plastic material in the lower second receiver element 23 and after curing, the front end of the receiver element is ground down or otherwise mechanically worked so that the openings of the hollow fiber membranes are exposed. Practically, a membrane module 19 consists only of a predetermined number of membrane elements 20, which however may not only be hollow fiber membranes 201, but also suitable pillow membranes 200, and of the first and second receiver elements 22 and 23 mounted onto the respective end areas 204, 205 of the membrane elements in the manner described earlier. The membrane module 19 includes no components providing for mechanical stabilization and is actually unstable without being fixed in the support elements 17 and 18. By fixing the membrane module 19 in the support elements 17, 18 sufficient stability is provided for the intended operation of the apparatus 10.

In the embodiment of the apparatus 10 as shown in the figures, the second support element 18 is disposed in a recess in a reception member 30 (see FIG. 1). The open ends 203 of the hollow fiber membranes 201 (this is true also for membrane pillows 200 if used as membrane elements 20) lead to a permeate collection channel 25 (see FIGS. 1 and 4), which extends radially outwardly such that the permeate 14, which flows from the interior of the hollow fiber membranes 201 into the permeate collection channel 25, can be discharged from the apparatus 10 in a suitable manner.

In the embodiment of the apparatus 10 as shown in the figures, the apparatus 10 includes a tubular housing 28, which surrounds the support elements 18, 19 and the membrane modules 19 and all the other elements of the apparatus 10. The tubular housing 28, which may comprise a suitable plastic or metal structure, also encloses the area of the reception member 30 disposed in the housing 28 which, as already mentioned, receives the second support element 18. It is circular and sized so that a gap remains between the outer cylindrical section 300 of the reception member 30 permitting the permeate 14 leaving the permeate collection channel 25 to flow to an outlet 15 for the permeate 14, which is formed in the reception member 30 and to flow from the apparatus 10 to be used as intended. The reception member 30 includes centrally therein an internal chamber 301, which forms a distribution space for the flow medium which is supplied thereto via through-bores 302 and which is admitted to the membrane modules for separation therein. From the internal chamber 301, the flow medium 11 flows through the passages 24 in the second receiver element 23 and then into the interior space 29 of the housing 28 and then through the flow passages 21. The flow medium 11 leaves the interior space 29 through the passages 21 in the first receiver element 22 and also through holes 170 in the support element 17 and flows into a closure member 31, which includes a central discharge passage 310 through which the concentrated flow medium 11 leaves the apparatus 10 as retentate 13. The reception member 30 as well as the closure member 31 are sealed with respect to the housing 28 by suitable sealing means for example in the form of circular rings of an elastomer material disposed in annular grooves formed in the reception member 30, and respectively, the closure member 31. Retaining rings 303 and 311 retain the reception member 30 and the closure member 31 in the housing 28. The retaining rings 303 and 311 can be easily removed so that the reception member 30 together with the membrane modules 19 can be removed from the housing 28 as a single piece. The closure member 31 can also be removed as a separate part.

The membrane modules 19 arranged in the apparatus 10 of which, as shown in the figures, four may be arranged in one housing have an axial length determined by the axial length of the membrane elements 20. However, membrane modules 19 of different lengths may be disposed in the housing 28 of the apparatus 10. Only the spacer rod 26, which may also be tubular since it has to accommodate only small axial forces, must be adapted to the length of the membrane elements 20 of the membrane modules 19. Small axial length differences of the membrane elements 20 of the membrane module 19 can be accommodated by providing a number of grooves in the axial projections of the first and second receiver elements 22, 23, so that the retaining rings 27 can be placed into the appropriate groove so as to releasably securing the membrane modules 19 to the mounting elements 17, 18.

The apparatus 10 may be cleaned for example by air under a pressure of about 1 bar, which is conducted through the flow path of the flow medium 11 through the apparatus 10. During this process, air under pressure of 6 bar is conducted at the same time into the membrane elements 20 through the flow path of the permeate 14.

What is claimed is:

1. An apparatus for the filtering and separation of flow media rich in foreign matter utilizing an ultrafiltration process, said apparatus including:

a housing with a membrane separating arrangement to which a flow medium is admitted, and by which a retentate enriched with foreign matter and a permeate depleted of foreign matter are generated;

said housing further including means for discharging at least said permeate from said apparatus;

said membrane separating arrangement comprising two support elements disposed in said housing in spaced relationship in an intended flow direction of said flow medium, and a plurality of membrane modules having receiver elements disposed at opposite ends mounted between said two support elements;

each of said membrane modules including hollow fiber ultrafiltration membrane elements being arranged as to define a cylindrical flow channel, wherein said cylindrical flow channel is free of any obstructions, for conducting said flow medium axially through each of said membrane modules along said membrane elements;

said receiver elements including openings axially aligned with said cylindrical flow channels to permit straight-through flow of said flow medium through said membrane modules;

said receiver elements firmly engaging the opposite ends of said membrane elements;

one of said support elements including a permeate collection channel to which the membrane elements connected to said receiver elements extend with their permeate side in communication with said collection channel for conducting said permeate out of said apparatus;

said two support elements being held in spaced relationship by a spacer structure;

whereby said membrane separating arrangement is slidably received in said housing so as to be slidably removable from said housing.

2. An apparatus according to claim 1, wherein said membrane modules are stretched between said support elements.

3. An apparatus according to claim 1, wherein each of said membrane elements have opposite ends and are closed at one end adjacent one of the support elements while the other ends of said membrane elements are open.

4. An apparatus according to claim 3, wherein the opposite ends of the membrane elements are fixed in said receiver elements, and wherein the closed ends of said membrane elements are disposed in a first set of receiver elements so as to be sealed with respect to the flow medium.

5. An apparatus according to claim 4, wherein the closed ends of the membrane elements are disposed adjacent the second support element in a second of receiver elements so as to be sealed with respect to the flow medium.

6. An apparatus according to claim 5, wherein said each second receiver element includes a permeate collection channel to which open ends of the membrane elements extend.

7. An apparatus according to claim 6, wherein at least said second support element is removably fixed in the housing so as to be sealed with respect to the interior of the housing and forming between said housing and said second support element a permeate discharge passage in communication with said collection channel.

8. An apparatus according to claim 1, wherein said spacer structure holding said support elements at a distance from each other comprises at least one spacer rod extending centrally between said support elements.

9. An apparatus according to claim 1, wherein said first and second receiver elements are fixed to the support elements by means of releasable retaining elements.

* * * * *